United States Patent
Takahashi

(10) Patent No.: US 11,661,539 B2
(45) Date of Patent: May 30, 2023

(54) METHOD FOR MANUFACTURING POLISHING PARTICLES AND METHOD FOR POLISHING SYNTHETIC QUARTZ GLASS SUBSTRATE

(71) Applicant: SHIN-ETSU CHEMICAL CO., LTD., Tokyo (JP)

(72) Inventor: Mitsuhito Takahashi, Annaka (JP)

(73) Assignee: SHIN-ETSU CHEMICAL CO., LTD., Tokyo (JP)

(*) Notice: Subject to any disclaimer, the term of this patent is extended or adjusted under 35 U.S.C. 154(b) by 204 days.

(21) Appl. No.: 16/599,178

(22) Filed: Oct. 11, 2019

(65) Prior Publication Data

US 2020/0131415 A1   Apr. 30, 2020

(30) Foreign Application Priority Data

Oct. 31, 2018  (JP) .............................. JP2018-206011

(51) Int. Cl.
| | | |
|---|---|---|
| C09G 1/02 | (2006.01) | |
| C09K 3/14 | (2006.01) | |
| B24B 37/04 | (2012.01) | |
| C03C 19/00 | (2006.01) | |
| C01F 17/206 | (2020.01) | |

(52) U.S. Cl.
CPC .......... *C09K 3/1409* (2013.01); *B24B 37/044* (2013.01); *C01F 17/206* (2020.01); *C03C 19/00* (2013.01); *C09G 1/02* (2013.01); *C01P 2004/04* (2013.01); *C01P 2006/90* (2013.01)

(58) Field of Classification Search
None
See application file for complete search history.

(56) References Cited

U.S. PATENT DOCUMENTS

| | | | | |
|---|---|---|---|---|
| 6,645,265 | B1* | 11/2003 | Wang | ...................... C03C 19/00 |
| | | | | 106/3 |
| 7,241,204 | B2* | 7/2007 | Watanabe | ............. B24B 37/245 |
| | | | | 451/307 |
| 9,000,199 | B2* | 4/2015 | Hong | ..................... C07F 19/00 |
| | | | | 264/44 |
| 9,616,542 | B2* | 4/2017 | Hasegawa | ................ C09G 1/02 |
| 2002/0016146 | A1 | 2/2002 | Kuramochi et al. | |

(Continued)

FOREIGN PATENT DOCUMENTS

| | | | |
|---|---|---|---|
| CN | 105331332 A | * | 2/2016 |
| JP | 2001-348271 A | | 12/2001 |

(Continued)

OTHER PUBLICATIONS

Sankar et al; "Synthesis and Characterization of Nano Cerium Oxide Using Hydrothermal Technique"; Incas Bulletin, vol. 13, Issue Jan. 2021, pp. 173-181. (Year: 2021).*

(Continued)

*Primary Examiner* — Shamim Ahmed
(74) *Attorney, Agent, or Firm* — Oliff PLC

(57) ABSTRACT

The present invention is polishing particles for polishing a synthetic quartz glass substrate. The polishing particles contain cerium-based polishing particles and have a breaking strength, which is measured by a compression tester, of 30 MPa or more. This provides polishing particles for polishing a synthetic quartz glass substrate while sufficiently reducing generation of defects due to polishing.

10 Claims, 1 Drawing Sheet

(56) References Cited

U.S. PATENT DOCUMENTS

| | | |
|---|---|---|
| 2004/0035153 A1 | 2/2004 | Koike et al. |
| 2006/0172663 A1* | 8/2006 | Zhang .................. B24B 53/017 |
| | | 451/5 |
| 2008/0311487 A1 | 12/2008 | Ito et al. |
| 2010/0148113 A1* | 6/2010 | Oh ........................ C01F 17/247 |
| | | 252/79.1 |
| 2015/0175846 A1 | 6/2015 | Yoshida et al. |
| 2016/0194539 A1 | 7/2016 | Nagai et al. |
| 2016/0266482 A1* | 9/2016 | Umeo ....................... G03F 1/22 |
| 2016/0272860 A1* | 9/2016 | Mizoguchi ........... C09K 3/1463 |

FOREIGN PATENT DOCUMENTS

| | | |
|---|---|---|
| JP | 2004-098278 A | 4/2004 |
| JP | 2004-261945 A | 9/2004 |
| JP | 2007-213020 A | 8/2007 |
| JP | 2009/279720 A | 12/2009 |
| JP | 2015-120844 A | 7/2015 |
| WO | 2015/019877 A1 | 2/2015 |
| WO | 2016/017819 A1 | 2/2016 |

OTHER PUBLICATIONS

Sahoo et al; Materials and Manufacturing Processes, 25: 982-989, 2010; http://www.tandfonline.com/loi/lmmp20; Published online: Sep. 8, 2010; Hydrothermal Synthesis of Single Crystalline Nano $CeO_2$ and Its Structural, Optical, and Electronic Characterization (Year: 2010).*

Nov. 9, 2021 Office Action issued in Japanese Application No. 2018-206011.

* cited by examiner

[FIG. 1]
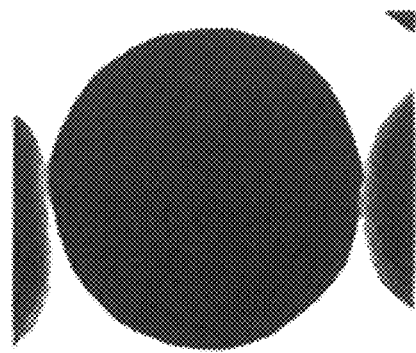
[FIG. 2]
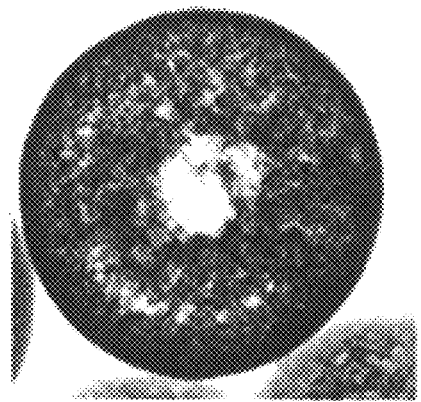
[FIG. 3]
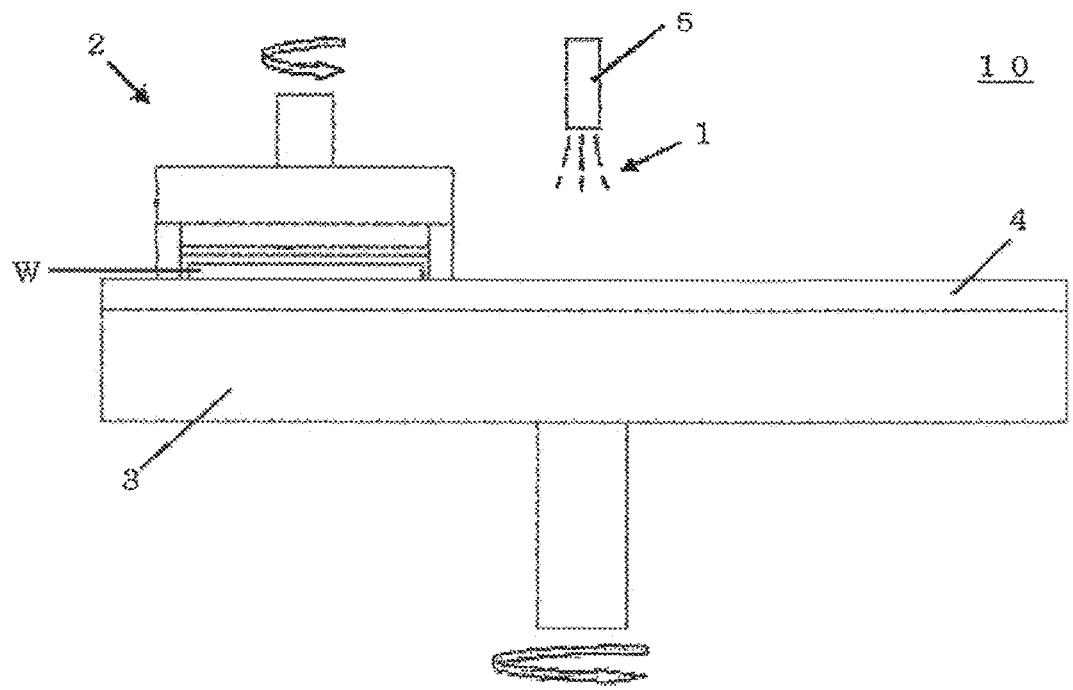

METHOD FOR MANUFACTURING POLISHING PARTICLES AND METHOD FOR POLISHING SYNTHETIC QUARTZ GLASS SUBSTRATE

TECHNICAL FIELD

The present invention relates to polishing particles for polishing a synthetic quartz glass substrate, a method for manufacturing the polishing particles, and a method for polishing a synthetic quartz glass substrate using the polishing particles.

BACKGROUND ART

In recent years, a synthetic quartz glass substrate is required to meet more stringent standards for qualities such as defect density, defect size, surface roughness, and flatness, due to miniaturization of a pattern by photolithography. Above all, higher quality is required against defects on the substrate as integrated circuits become finer and magnetic media have higher capacity.

In view of this, in order to improve the quality of a quartz glass substrate after polishing, it is strongly required of polishing particles used for polishing a synthetic quartz glass substrate that the polished quartz glass substrate have small surface roughness and that the polished quartz glass substrate have few surface defects such as a scratch on the surface.

Conventionally, in general, silica-based polishing particles have been investigated to be used as the polishing particles for polishing a synthetic quartz glass. Silica-based slurry is produced by subjecting silica particles to grain growth through thermal decomposition of silicon tetrachloride and adjusting pH with an alkaline solution containing no alkali metal such as sodium. For example, Patent Document 1 describes that defects can be reduced by using high-purity colloidal silica around neutrality. However, considering the isoelectric point of colloidal silica, colloidal silica is unstable around neutrality, and there is fear that colloidal silica abrasive grains fluctuate in particle size distribution during polishing, and cannot be stably used. Therefore, it is difficult for the polishing particles to be circulated and repeatedly used, and the polishing particles are disposed at one-time use, which is economically unfavorable. Moreover, Patent Document 2 describes that defects can be reduced by using a polishing agent containing an acid and colloidal silica having an average primary particle size of 60 nm or less. However, this polishing agent is insufficient to satisfy current requirements, and requires improvement.

On the other hand, ceria ($CeO_2$) particles are known as a strongly oxidizing agent and have chemically active characteristics, and therefore, compared to colloidal silica, are effective for improving the polishing rate of an inorganic insulator such as glass.

However, typical ceria-based polishing agents use dry ceria particles, and the dry ceria particles have irregular crystal shapes. Thus, when dry ceria is used in a polishing agent, defects such as a scratch are more likely to be generated on the surface of the quartz glass substrate than when spherical colloidal silica is used. In addition, ceria-based polishing agents have poor dispersion stability compared to colloidal silica, and there is also a problem of sedimentation of the particles.

CITATION LIST

Patent Literature

Patent Document 1: Japanese Unexamined Patent Application Publication No. 2004-98278
Patent Document 2: Japanese Unexamined Patent Application Publication No. 2007-213020

SUMMARY OF INVENTION

Technical Problem

When wet ceria particles in polyhedral crystal shapes are used instead of dry ceria particles as a ceria-based polishing agent for a synthetic quartz glass substrate, although defects such as a scratch are reduced compared to dry ceria particles, the defects are not reduced sufficiently to meet the requirements. Moreover, wet ceria particles being harder than colloidal silica also readily causes defects.

The present invention has been accomplished in view of the above-described problems. It is an object of the present invention to provide polishing particles for polishing a synthetic quartz glass substrate while sufficiently reducing generation of defects due to polishing, and a method for manufacturing the polishing particles. Another object of the present invention is to provide a method for polishing a synthetic quartz glass substrate while sufficiently reducing defects due to polishing.

Solution to Problem

To achieve the object, the present invention provides polishing particles for polishing a synthetic quartz glass substrate, wherein the polishing particles comprise cerium-based polishing particles and have a breaking strength, which is measured by a compression tester, of 30 MPa or more.

Such polishing particles for polishing can inhibit defects such as a scratch due to polishing.

Further, the polishing particles for polishing preferably have a breaking strength of 50 MPa or more. Generation of defects such as a scratch due to polishing can be more reliably inhibited by using polishing particles with such a breaking strength to polish a synthetic quartz glass substrate.

Further, the present invention provides a method for manufacturing the above polishing particles for polishing a synthetic quartz glass substrate, wherein the polishing particles for polishing are manufactured by a wet precipitation method using a rare earth salt and an excessive alkali compound.

Thus, particles with a uniform particle size can be manufactured, and by using polishing particles manufactured in this way, generation of defects due to polishing can be sufficiently reduced.

Here, the rare earth salt is preferably a rare earth nitrate, and the alkali compound is preferably urea or a urea compound.

Thus, the polishing particles can be efficiently deposited.

Further, the present invention provides a method for polishing a synthetic quartz glass substrate, comprising a rough polishing step and a final polishing step after the rough polishing step, wherein the above polishing particles for polishing a synthetic quartz glass substrate are used in the final polishing step for final polishing.

Such a polishing method using the polishing particles for polishing a synthetic quartz glass substrate of the present invention can inhibit generation of defects due to polishing. As a result, a synthetic quartz glass substrate with remarkably few defects can be obtained efficiently.

Advantageous Effects of Invention

As described above, the present invention enables polishing rate improvement and sufficient inhibition of defect generation on the surface of a synthetic quartz glass substrate when polishing the synthetic quartz glass substrate. As a result, the productivity and yield can be improved in the production of synthetic quartz glass substrates. By using the polishing particles for polishing a synthetic quartz glass substrate of the present invention, finer semiconductor devices can be obtained.

BRIEF DESCRIPTION OF DRAWINGS

FIG. 1 is a cross-sectional TEM image of a cerium-based polishing particle with a breaking strength of 55 MPa as measured by a compression tester which can be used in the present invention;

FIG. 2 is a cross-sectional TEM image of a cerium-based polishing particle with a breaking strength of 15 MPa as measured by the compression tester; and FIG. 3 is a schematic diagram of a polishing apparatus that can be used in a polishing method of a synthetic quartz glass substrate of the present invention.

DESCRIPTION OF EMBODIMENTS

As stated above, the development of polishing particles for polishing a synthetic quartz glass substrate that can sufficiently inhibit the generation of defects on the surface of a synthetic quartz glass substrate due to polishing has been required.

The inventor has diligently investigated on the foregoing problems and found that, by using particles manufactured so as to have a breaking strength in a predetermined range measured by a compression tester as polishing particles for the final polishing of a synthetic quartz glass substrate, the destruction of the particles during polishing due to stress concentration can be inhibited, making it possible to reduce the generation of defects caused by irregular particles that result from the particle destruction, and the synthetic quartz glass substrate can be polished with few defects, thereby completing the present invention.

Specifically, the present invention is polishing particles for polishing a synthetic quartz glass substrate, wherein the polishing particles comprise cerium-based polishing particles and have a breaking strength, which is measured by a compression tester, of 30 MPa or more.

Hereinafter, embodiments of the present invention will be described, but the present invention is not limited thereto.

As stated above, the polishing particles for polishing a synthetic quartz glass substrate (hereinafter, also referred to simply as "polishing particles") of the present invention are cerium-based polishing particles, which are particles that can be manufactured by wet precipitation reaction between a rare earth salt including a cerium salt and an excessive alkali compound, and which have a breaking strength of 30 MPa or more measured by a compression tester.

By using the inventive polishing particles for polishing a synthetic quartz glass substrate as described above, compared to colloidal silica, the polishing rate can be improved, and at the same time, generation of defects such as a scratch due to polishing can be inhibited.

Hereinafter, the inventive polishing particles for polishing a synthetic quartz glass substrate and the polishing of a synthetic quartz glass substrate with the inventive polishing particles are explained in more detail.

Generally, silica particles are used in the final polishing of a synthetic quartz glass substrate. This is because a highly smooth surface with few defects can be obtained due to the smooth surface of silica particles. However, since silica particles, unlike cerium-based particles, have a low reactivity to glass, the polishing rate is low, and silica particles cannot be described as polishing particles with a high polishing ability.

Although it is possible to improve polishing ability by using cerium-based particles, which have high reactivity to glass, defects such as a scratch are more likely to be generated by polishing compared to silica particles. Presumably, this results from the shapes of cerium-based particles being irregular compared to silica-based particles, and from higher hardness than silica-based particles, making it difficult to relax stress by the change in the particle shapes at the stress concentration during polishing, and therefore, the particles are destroyed and the resulting particles with irregular shapes are likely to cause scratches and defects.

Thus, for example, by using particles which have a high breaking strength, and which are manufactured by wet precipitation reaction between a rare earth salt including a cerium salt and an excessive alkali compound, as polishing particles, it is possible to inhibit particle destruction during polishing due to stress concentration, and generation of defects such as a scratch can be reduced.

In particular, the breaking strength of the inventive polishing particles for polishing is preferably 50 MPa or more. This is because, by polishing a synthetic quartz glass substrate using polishing particles with such a breaking strength, the production of irregular-shaped particles can be inhibited further, and the generation of defects on the surface of a substrate due to polishing can be reduced more reliably.

On the other hand, when the breaking strength of the polishing particles is less than 30 MPa, the particles are destroyed as described above, resulting in the generation of irregular-shaped particles, which likely cause scratches on the substrate as a polishing target.

It is to be noted that examples of a compression tester to measure the breaking strength of polishing particles include microcompression tester MCT series manufactured by Shimadzu Corporation.

The average primary particle size of the inventive polishing particles is preferably 100 nm to 500 nm, more preferably 100 nm to 400 nm, and particularly preferably 100 nm to 300 nm. The polishing particles with an average primary particle size of 100 nm or more have sufficiently enough ability to polish quartz glass. In addition, when the average primary particle size is 500 nm or less, generation of defects such as a scratch due to polishing can be favorably inhibited.

Such polishing particles of the present invention are preferably manufactured by a wet precipitation method such that a solution in which a rare earth salt including a cerium salt has been dissolved in water and a basic solution in which an excessive alkali compound is dissolved in water are mixed and subjected to a heat treatment.

In the inventive manufacturing method of polishing particles for polishing a synthetic quartz glass substrate, first, a cerium solution can be produced by mixing cerium nitrate, which is a precursor as a rare earth salt, with ultrapure water. Next, a basic solution is produced. As the alkali compound of the basic solution, urea or a urea compound can be used, having been mixed with ultrapure water to adjust the concentration to an appropriate value. Here, as the urea compound, dimethylacetylurea, benzenesulfonylurea, trimethylurea, tetraethylurea, tetramethylurea, triphenylurea, tetraphenylurea, etc. can be used.

The cerium ion concentration in the solution can be within the range of 0.01 mol·dm$^{-3}$ to 0.1 mol·dm$^{-3}$. In addition, an excessive basic solution (alkali compound) is mixed with the solution of rare earth salt, and the ion concentration in the basic solution is preferably 20 to 50 times the ion concentration of the solution of rare earth salt.

By setting the ion concentration of the solution of rare earth salt and the ion concentration of the basic solution within the above ranges, the particles with a uniform particle size can be manufactured.

Next, after transferring the produced solution of rare earth salt and the basic solution to a reaction vessel in a predetermined mixing ratio, the solution is stirred, and the reaction is performed at a predetermined temperature. Here, the reaction may be performed in a reaction temperature of 100° C. or less, for example, 80° C. or more and 100° C. or less, and the reaction time may be 1 hour or more, for example, 2 hours to 3 hours. In addition, the heating rate from room temperature to the reaction temperature may be 3° C. to 6° C. per minute, preferably 4° C. per minute.

The solution after the reaction is finished is cooled to room temperature. A solution in which cerium-based particles with an average primary particle size of 500 nm or less, for example, are generated is produced through such processes.

Next, the generated particles are dried by heat. Here, the particles are preferably dried at a heating temperature of 200° C. or less, preferably 80° C. or less. When the drying temperature exceeds 200° C., a low-density area may be formed inside the dried particles as shown in FIG. 2; as a result, the breaking strength may be lowered, and the particles may be destroyed due to stress during polishing, causing defects such as a scratch in some cases.

On the other hand, with a drying temperature of 200° C. or less, a high breaking strength can be obtained without forming a low-density area inside the particles as shown in FIG. 1, making the particles less liable to breaking during polishing, which reduces the generation of defects.

As described above, in the inventive method for manufacturing polishing particles for polishing a synthetic quartz glass substrate, a wet precipitation method is used: the temperature of a mixed solution of a solution of rare earth salt and a basic solution (alkali compound) is raised at an appropriate heating rate; the mixed solution is heated at an appropriate range of reaction temperature; and the resulting particles are heat-dried at an appropriate temperature. Thus, polishing particles of 100 nm to 500 nm are manufactured.

Next, a method for polishing a synthetic quartz glass substrate using the inventive polishing particles for polishing a synthetic quartz glass substrate is explained. Since it is particularly favorable to use the inventive polishing particles in a final polishing step after a rough polishing step, a method in which single-side polishing is performed in the final polishing step is explained as an example. However, of course, the present invention is not limited thereto, and the inventive polishing particles can also be used for rough polishing. Moreover, the inventive polishing particles can be used not only for single-side polishing, but also for double-side polishing.

A single-side polishing apparatus usable for the inventive polishing method can be, for example, a single-side polishing apparatus 10 that includes a turn table 3 with a polishing pad 4 attached, a polishing agent supply mechanism 5, a polishing head 2, and so forth as shown in FIG. 3. Moreover, as shown in FIG. 3, the polishing head 2 can hold a synthetic quartz glass substrate W to be polished, and can rotate. Moreover, the turn table 3 can also rotate. For the polishing pad 4, nonwoven fabric, foamed polyurethane, porous resins or the like can be used. Moreover, since the surface of the polishing pad 4 is preferably always covered with a polishing agent 1 including the inventive polishing particles during polishing, the polishing agent supply mechanism 5 is preferably provided with a pump or the like to supply the polishing agent 1 continuously. In such a single-side polishing apparatus 10, the synthetic quartz glass substrate W is held by the polishing head 2, and the polishing agent 1 is supplied from the polishing agent supply mechanism 5 to the polishing pad 4. Then, the turn table 3 and the polishing head 2 are each rotated to bring the surface of the synthetic quartz glass substrate W into sliding contact with the polishing pad 4 for polishing. Such a polishing method using the inventive polishing particles can inhibit generation of defects due to polishing. Moreover, the inventive polishing method can provide a synthetic quartz glass substrate having significantly few defects efficiently, and thus is suitably used for the final polishing.

In particular, a synthetic quartz glass substrate subjected to the final polishing by the inventive polishing method can be used for semiconductor-related electronic materials (in particular, semiconductor-related electronic materials for cutting-edge application), and can be suitably used for photomask, nanoimprinting, and magnetic devices. In addition, a synthetic quartz glass substrate before finish polishing can be prepared, for example, by the following procedure. First, a synthetic quartz glass ingot is formed, and then the synthetic quartz glass ingot is annealed. Next, the synthetic quartz glass ingot is sliced into wafers, and the sliced wafers are chamfered and then lapped. Subsequently, the surface of each wafer is polished to a mirror finish. The synthetic quartz glass substrate thus prepared can be subjected to the final polishing by the inventive polishing method.

EXAMPLE

Hereinafter, the present invention will be more specifically described with reference to Examples and Comparative Examples. However, the present invention is not limited to Examples described below.

Example 1

400 g of a cerium solution was prepared by diluting 8.00 g of 1 mol/l cerium nitrate solution with pure water.

Subsequently, 1000 g of a reaction solution was prepared by diluting 48 g of 5 mol/l urea solution with 600 g of pure water to prepare a urea solution, and mixing the urea solution with the cerium solution.

The prepared reaction solution was poured into a separable flask, the reaction solution was heated and stirred for 2 hours at 90° C., and particles were deposited in the reaction solution.

The deposited particles were collected with a centrifugal separator and heat-dried for 2 hours at 210° C. The breaking strength measured by a microcompression tester MCT-510 (manufactured by Shimadzu Corporation) was 30 MPa.

In addition, the average primary particle size, calculated using a transmission electron microscope, was 350 nm.

Subsequently, 50 g of the polishing particles were mixed with 950 g of pure water, and subjected to ultrasonic dispersion treatment under stirring. Thus, 1000 g of a 5% polishing agent was produced.

Next, as shown in FIG. 3, a synthetic quartz glass substrate (4 inch: 100 mm) W was polished by the inventive method for polishing a synthetic quartz glass substrate using this polishing agent.

Specifically, a polishing pad (made of soft suede manufactured by FILWEL Co., Ltd.) 4 was attached to a turn table 3. To a polishing head 2 to which a synthetic quartz glass substrate W can be attached, a roughly polished synthetic quartz glass substrate W was set. Then, the synthetic quartz glass substrate W was polished by 1 μm or more, which is enough to remove the defects generated in the rough polishing step. Here, the polishing load was set to 100 gf/cm$^2$, the rotational speeds of the turn table 3 and the polishing head 2 were set to 50 rpm, and the above polishing particles for polishing a synthetic quartz glass substrate were supplied at 100 ml per minute. After polishing, the synthetic quartz glass substrate W was taken from the polishing head 2, washed with pure water, and further, after being subjected to ultrasonic cleaning, dried at 80° C. with a drier. The number of defects of 100 nm or more generated on the surface of the polished synthetic quartz glass substrate W was measured with a laser microscope. The number of defects was 1.

Example 2

Polishing particles were manufactured by the same procedure as in Example 1 except that the heat-drying temperature was set to 200° C. The breaking strength measured with a microcompression tester (manufactured by Shimadzu Corporation) was 32 MPa, and the average primary particle size calculated with a transmission electron microscope was 350 nm.

Moreover, the number of defects of 100 nm or more generated on the surface of the polished synthetic quartz glass substrate W was measured with a laser microscope. The number of defects was 1.

Example 3

Polishing particles were manufactured by the same procedure as in Example 1 except that the heat-drying temperature was set to 150° C. The breaking strength measured with a microcompression tester (manufactured by Shimadzu Corporation) was 43 MPa, and the average primary particle size calculated with a transmission electron microscope was 380 nm.

Moreover, the number of defects of 100 nm or more generated on the surface of the polished synthetic quartz glass substrate W was measured with a laser microscope. The number of defects was 1.

Example 4

Polishing particles were manufactured by the same procedure as in Example 1 except that the heat-drying temperature was set to 100° C. The breaking strength measured with a microcompression tester (manufactured by Shimadzu Corporation) was 48 MPa, and the average primary particle size calculated with a transmission electron microscope was 360 nm.

Moreover, the number of defects of 100 nm or more generated on the surface of the polished synthetic quartz glass substrate W was measured with a laser microscope. The number of defects was 1.

Example 5

Polishing particles were manufactured by the same procedure as in Example 1 except that the heat-drying temperature was set to 80° C. The breaking strength measured with a microcompression tester (manufactured by Shimadzu Corporation) was 55 MPa, and the average primary particle size calculated with a transmission electron microscope was 380 nm.

Moreover, the number of defects of 100 nm or more generated on the surface of the polished synthetic quartz glass substrate W was measured with a laser microscope. The number of defects was 0.

Comparative Example 1

Polishing particles were manufactured by the same procedure as in Example 1 except that the heat-drying temperature was set to 220° C. The breaking strength measured with a microcompression tester (manufactured by Shimadzu Corporation) was 28 MPa, and the average primary particle size calculated with a transmission electron microscope was 380 nm.

Moreover, the number of defects of 100 nm or more generated on the surface of the polished synthetic quartz glass substrate W was measured with a laser microscope. The number of defects was 11.

Comparative Example 2

Polishing particles were manufactured by the same procedure as in Example 1 except that the heat-drying temperature was set to 400° C. The breaking strength measured with a microcompression tester (manufactured by Shimadzu Corporation) was 22 MPa, and the average primary particle size calculated with a transmission electron microscope was 380 nm.

Moreover, the number of defects of 100 nm or more generated on the surface of the polished synthetic quartz glass substrate W was measured with a laser microscope. The number of defects was 22.

Comparative Example 3

Polishing particles were manufactured by the same procedure as in Example 1 except that the heat-drying temperature was set to 600° C. The breaking strength measured with a microcompression tester (manufactured by Shimadzu Corporation) was 18 MPa, and the average primary particle size calculated with a transmission electron microscope was 380 nm.

Moreover, the number of defects of 100 nm or more generated on the surface of the polished synthetic quartz glass substrate W was measured with a laser microscope. The number of defects was 39.

Comparative Example 4

Polishing particles were manufactured by the same procedure as in Example 1 except that the heat-drying temperature was set to 700° C. The breaking strength measured with a microcompression tester (manufactured by Shimadzu Corporation) was 15 MPa, and the average primary particle size calculated with a transmission electron microscope was 350 nm.

Moreover, the number of defects of 100 nm or more generated on the surface of the polished synthetic quartz glass substrate W was measured with a laser microscope. The number of defects was 56.

The results of Examples 1 to 5 and Comparative Examples 1 to 4 described above are given in Table 1. It is to be noted that the numbers given in the table are the average values of five synthetic quartz glass substrates W polished in each Example and Comparative Example.

TABLE 1

|  | Breaking strength (MPa) | Heat-drying temperature (° C.) | Particle size (μm) | Defects (Number) |
|---|---|---|---|---|
| Example 1 | 30 | 210 | 350 | 1 |
| Example 2 | 32 | 200 | 350 | 1 |
| Example 3 | 43 | 150 | 380 | 1 |
| Example 4 | 48 | 100 | 360 | 1 |
| Example 5 | 55 | 80 | 380 | 0 |
| Comparative Example 1 | 28 | 220 | 380 | 11 |
| Comparative Example 2 | 22 | 400 | 380 | 22 |
| Comparative Example 3 | 18 | 600 | 380 | 39 |
| Comparative Example 4 | 15 | 700 | 380 | 56 |

The generation of defects was inhibited when the synthetic quartz glass substrates W were polished using the polishing particles of Examples 1 to 5, i.e., polishing particles with a breaking strength, which was measured by a compression tester, of 30 MPa or more.

On the other hand, with the polishing particles of Comparative Examples 1 to 4, which had breaking strengths of less than 30 MPa, it can be presumed that the particles were destroyed during polishing due to the low strength, and the number of defects was increased.

As described above, it has been shown that by polishing a synthetic quartz glass substrate with the inventive polishing particles for polishing a synthetic quartz glass substrate, the synthetic quartz glass substrate can be polished with sufficiently inhibited generation of defects.

It should be noted that the present invention is not limited to the above-described embodiments. The embodiments are just examples, and any examples that have substantially the same feature and demonstrate the same functions and effects as those in the technical concept described in claims of the present invention are included in the technical scope of the present invention.

The invention claimed is:

1. A method for manufacturing polishing particles for polishing a synthetic quartz glass substrate, wherein the polishing particles for polishing are manufactured by a wet precipitation reaction performed at a reaction temperature of 100° C. or less and between a cerium salt that has been dissolved exclusively in water to form a solution thereof and an alkali compound that has been dissolved exclusively in water to form a basic solution thereof,
the polishing particles are then heat-dried at 80 to 210° C., and
the polishing particles have a compression breaking strength of 30 MPa or more.

2. The method for manufacturing the polishing particles according to claim 1, wherein the cerium salt is a cerium nitrate, and the alkali compound is urea or a urea compound.

3. The method for manufacturing the polishing particles for polishing a synthetic quartz glass substrate according to claim 1, further comprising measuring the compression breaking strength using a compression tester.

4. The method for manufacturing the polishing particles for polishing a synthetic quartz glass substrate according to claim 1, wherein the compression breaking strength is 50 MPa or more.

5. The method for manufacturing the polishing particles for polishing a synthetic quartz glass substrate according to claim 1, wherein the average primary particle size of the polishing particles is 100 nm to 500 nm.

6. The method for manufacturing the polishing particles for polishing a synthetic quartz glass substrate according to claim 5, wherein the average primary particle size is 100 nm to 400 nm.

7. The method for manufacturing the polishing particles for polishing a synthetic quartz glass substrate according to claim 5, wherein the average primary particle size is 100 nm to 300 nm.

8. The method for manufacturing the polishing particles for polishing a synthetic quartz glass substrate according to claim 1, wherein cerium ion concentration in the solution is within the range of 0.01 mol·dm$^{-3}$ to 0.1 mol·dm$^{-3}$ and the ion concentration in the basic solution is 20 to 50 times the ion concentration of the solution of cerium salt.

9. The method for manufacturing the polishing particles for polishing a synthetic quartz glass substrate according to claim 1, wherein the reaction temperature is 80° C. or more and 100° C. or less.

10. The method for manufacturing the polishing particles for polishing a synthetic quartz glass substrate according to claim 9, wherein the wet precipitation reaction time is from 1 to 3 hours.

* * * * *